United States Patent [19]

Solow

[11] Patent Number: 4,819,355
[45] Date of Patent: Apr. 11, 1989

[54] MOTORCYCLE LICENSE PLATE FRAME

[75] Inventor: Joseph E. Solow, Plainview, N.Y.

[73] Assignee: Wolo Manufacturing Corporation, Deer Park, N.Y.

[21] Appl. No.: 78,531

[22] Filed: Jul. 28, 1987

[51] Int. Cl.⁴ ............................................. B60R 13/10
[52] U.S. Cl. ........................................ 40/209; 40/204
[58] Field of Search ................. 40/209, 200, 579, 580, 40/154, 618, 204–206

[56] References Cited

U.S. PATENT DOCUMENTS

| | | | |
|---|---|---|---|
| 1,390,732 | 9/1921 | Speicher | 40/209 |
| 1,653,497 | 12/1927 | Dube et al. | 40/209 |
| 1,771,039 | 7/1930 | Hedglon | 40/209 |
| 1,793,696 | 2/1931 | Ipsen | 40/209 |
| 1,857,141 | 5/1932 | Corley | 40/209 |
| 2,361,479 | 10/1944 | Joffo | 40/204 |
| 2,555,706 | 6/1951 | Schultz | 40/209 |
| 2,709,314 | 5/1955 | Allen | 40/200 |
| 2,765,553 | 10/1956 | Audette | 40/209 |
| 2,875,539 | 3/1959 | Gladd | 40/580 |
| 2,910,793 | 11/1959 | Helmer | 40/209 |
| 3,097,443 | 7/1963 | Kellner | 40/152 |
| 3,187,452 | 6/1965 | Dotson | 40/209 |
| 3,535,807 | 10/1970 | Baldwin | 40/618 |
| 3,808,722 | 5/1974 | Byers et al. | 40/152 |
| 3,921,324 | 11/1975 | Flannery | 40/580 |
| 4,037,342 | 7/1977 | Bott | 40/209 |
| 4,138,787 | 2/1979 | Sarkisian | 40/618 |
| 4,270,287 | 6/1981 | Gimbel | 40/152 |

Primary Examiner—Paul J. Hirsch
Attorney, Agent, or Firm—Brumbaugh, Graves, Donohue & Raymond

[57] ABSTRACT

A license plate frame includes a plastic frame member with a central opening. Removeable frame portions are provided to enlarge the opening for use with larger plate sizes.

1 Claim, 2 Drawing Sheets

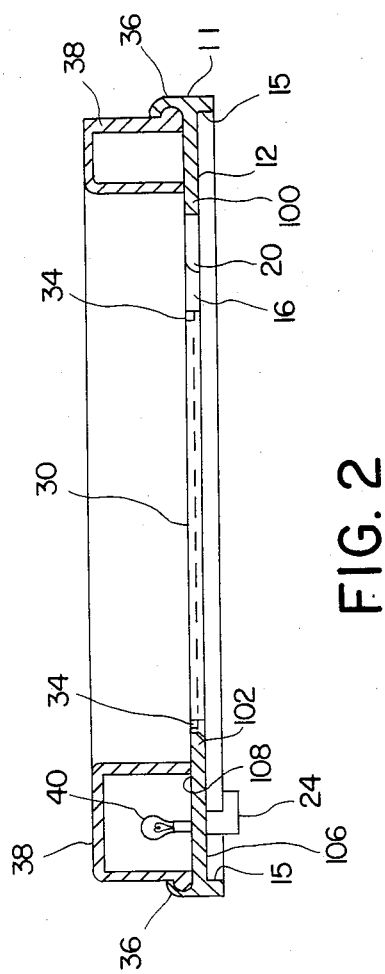
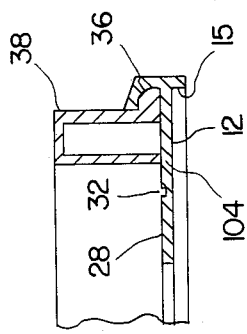
FIG. 2
FIG. 3

MOTORCYCLE LICENSE PLATE FRAME

BACKGROUND OF THE INVENTION

The present invention relates to license plate frames, and particularly to license plate frames for motorcycles.

While automobile license plates in the United States are generaly of uniform size, license plates issued for motorcycles, mopeds, snowmobiles and other smaller vehicles vary in size among the individual states. For example New York State issues a plate approximately seven inches by four inches and New Jersey issues a plate approximately 7⅛ inches by 3½ inches. While mounting brackets can be provided with slotted bolt receiving holes to accomodate varying hole spacing on such plates, license plate frames which include a central opening must be provided in varying sizes to accommodate the plates of different states without either having unattractive gaps between the plate and the frame or obstructing information on the plate itself.

Prior U.S. Pat. Nos. 1,390,732; 1,653,497; 1,771,039; 1,793,696; 1,857,141 and 2,555,706 are directed to frames for varying size plates. All of these patents provide means for varying the overall frame size to accommodate varying plate sizes. Most of these approaches are not practical or cost effective for modern plastic frames and they cannot accommodate popular frames which include illuminated "twinkle" lights behind a plastic lens which surrounds the plate.

U.S. Pat. No. 2,709,314 provides a license plate holder that does not include an aperture, but merely a planar surface with selectable knock-out panels that can be used to surface mount a license plate with varying hole spacing. The frame itself is not adjustable to closely fit the plate in an attractive manner.

Accordingly it is an object of the present invention to provide a license plate frame arranged to receive and display license plates of varying sizes.

It is a further object to provide such a frame that is inexpensive and easy to fabricate of molded plastic and which can accommodate illuminated decorations around the plate.

SUMMARY OF THE INVENTION

In accordance with the present invention there is provided a license plate frame adapted to receive and frame license plates of varying size. The invention includes a generally planar frame member having a rectangular central opening and slotted bolt openings for attaching a license plate. The frame member includes at least one removeable frame portion adjoining the central opening and attached to the remaining portions of the planar frame member by frangible joints so that the removeable frame portion can be removed to enlarge the central opening.

According to a preferred embodiment of the invention there may be provided two of such removeable frame portions located symmetrically with respect to the opening. Decorative lighting may be mounted to the frame around the opening and covered with a continuous lens member surrounding the opening. The frame member can be molded in a single plastic piece with the frangible joints formed as a groove in one surface of the planar frame member surrounding the removeable frame portion.

For a better understanding of the present invention together with other and further objects thereof, reference is made to the following description, taken in conjunction with the accompanying drawings and its scope will be pointed out in the appended claims.

BRIEF DESCRIPTION OF THE DRAWINGS

FIG. 2 is a cross-sectional view of the FIG. 1 license plate frame along the lines 2—2.

FIG. 3 is a cross-sectional view of the FIG. 1 license plate frame along the lines 3—3.

DESCRIPTION OF THE INVENTION

Figure 1:
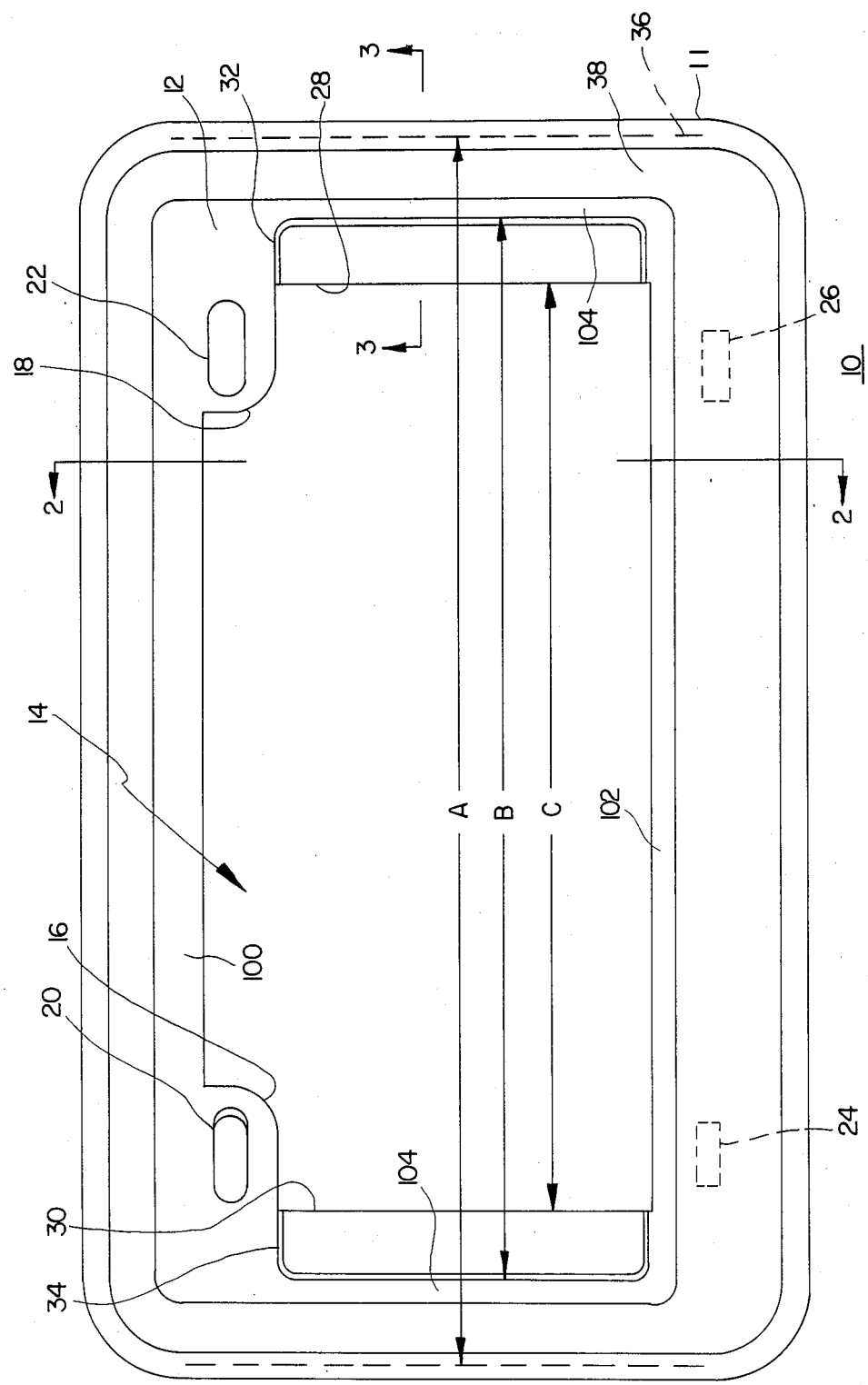
FIG. 1 is a plan view of a license plate frame in accordance with the present invention.

Referring generally to FIGS. 1 to 3, a license plate frame 10 includes a generally planar frame member 11 which is molded as a single plastic part. Frame 11 includes a planar central section 12 formed by upper and lower frame portions 100, 102 and opposed side frame portions 104, and a rim 15 surrounding the exterior edge and projecting from back face 106, to the rear of the planar frame member as viewed from FIG. 1. The upper, lower and side frame portions define an opening 14 which is generally rectangular. A pair of laterally spaced tabs 16 and 18 project from the upper frame portion 100 into the opening 14 and are provided with slots 20 and 22. Slots 20 and 22 are laterally elongated and arranged to receive mounting bolts projecting from license plates with varying hole spacing. Central section 12 includes lower engagement members in the form of L-shaped flanges 24 and 26 which project from the back face 106 of the lower frame portion 102 and receive the bottom edge of a license plate. The flanges 24, 26 hold the bottom edge against the rear of opening 14 when the upper mounting bolt holes of the plate are bolted to slots 20 and 22.

For decorative effect the frame 10 includes a projecting translucent lens member 38 which completely surround opening 14 and encloses decorative lights 40. Lens 38 is retained against the front face 108 of the frame member 11 by a surrounding rim 36 as shown in FIGS. 2 and 3.

A pair of removeable frame portions 28 and 30 project into opening 14 and are attached to the side frame portions 106 of frame member 11 by frangible joints 32 and 34 respectively. In the illustrated embodiment the frangible joints comprise grooves extending approximately 80 to 90% deep into the planar plastic material which has a thickness of approximately ⅛ inch. Accordingly frame portions 28 and 30 can be neatly broken away to accommodate a larger plate. In the case of a conventional type license plate having upper and lower edges and holes adjacent to the upper edge, the license plate is mounted by positioning its lower edge in the L-shape flanges 24 such that the license plate holes are aligned with the slots, and then bolting the license plate and tabs together. In the case of larger size license plates, the frame portions 28, 30 are broken off to expose the larger plate surface area.

The size of the opening and removeable portions shown in FIG. 1 are selected to accommodate at least two license plate sizes. The dimension A between the rearwardly extending rim 15 must be greater than the largest plate to be accommodated and in one embodiment is 222 mm. The width C of the opening 14 is selected to be smaller than the narrowest plate to be accommodated, but large enough to permit viewing of the numbers, state identification and date on the face of the plate, and in one embodiment is 180 mm. The width B of the opening after removal of portions 28 and 30 must be large enough to permit viewing of the largest plate accommodated and in one embodiment is 200 mm.

Those skilled in the art will recognize that other and further modifications may be made to the invention, including use of additional removeable portions and removeable portions of different size and shape as the needs require without departing from the spirit of the invention, and it is intended to claim all such changes and modifications as fall within the true scope of the invention.

I claim:

1. A license plate frame adapted to mount license plates of more than one size, such license plates being of the conventional type having top and bottom edges and a pair of laterally spaced mounting holes adjacent to the upper edge, said frame comprising:

a generally planar frame member including upper, lower, and side frame portions, wherein the frame portions have front and back faces and define a rectangular opening sized to frame a first size license plate;

lower engagement means projecting from the back face of said lower frame portion for engaging the lower edge of a license plate;

a pair of laterally spaced tabs projecting from said upper frame portion into said opening, wherein each tab includes a laterally elongated slot positioned to be aligned with one of the license plate mounting holes when the plate is positioned in the lower engagement means; and a pair of removable frame portions projecting from said side frame portions into said opening, wherein each removable frame portion is adjoined to the respective side frame portion by a frangible joint, and wherein the removable frame portions are sized to frame a second, narrow license plate.

* * * * *